US008600186B2

(12) United States Patent
Weiming et al.

(10) Patent No.: US 8,600,186 B2
(45) Date of Patent: Dec. 3, 2013

(54) WELL FOCUSED CATADIOPTRIC IMAGE ACQUISITION

(75) Inventors: Li Weiming, Hong Kong (CN); Li Youfu, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 838 days.

(21) Appl. No.: 12/767,317

(22) Filed: Apr. 26, 2010

(65) Prior Publication Data

US 2011/0261993 A1    Oct. 27, 2011

(51) Int. Cl.
*G06K 9/40* (2006.01)

(52) U.S. Cl.
USPC ......................................................... 382/255

(58) Field of Classification Search
USPC .............................. 382/255, 100; 359/707, 708
See application file for complete search history.

(56) References Cited

U.S. PATENT DOCUMENTS

| | | | |
|---|---|---|---|
| 3,505,465 A | 4/1970 | Rees | |
| 5,742,431 A * | 4/1998 | Meyers | 359/565 |
| 6,157,018 A | 12/2000 | Ishiguro et al. | |
| 6,738,569 B1 | 5/2004 | Sogabe et al. | |
| 6,927,922 B2 * | 8/2005 | George et al. | 359/708 |
| 7,420,750 B2 | 9/2008 | Kuthirummal et al. | |
| 7,499,644 B2 | 3/2009 | Franke et al. | |
| 2008/0151388 A1 * | 6/2008 | George et al. | 359/707 |
| 2009/0051890 A1 * | 2/2009 | Mann et al. | 355/67 |
| 2011/0261444 A1 * | 10/2011 | Epple et al. | 359/365 |
| 2011/0273669 A1 * | 11/2011 | Abitbol et al. | 351/212 |
| 2012/0062708 A1 * | 3/2012 | Johnson et al. | 348/49 |

OTHER PUBLICATIONS

C. Geyer and K. Daniilidis, "Catadioptric projective geometry," International Journal of Computer Vision, vol. 45, No. 3, pp. 223-243, 2001. Last accessed Aug. 20, 2010, 21 pages.
H. Ishiguro, Development of low cost compact omni-directional vision sensors and their applications, In: Benosman, R., Kang, S.B. (eds.) Panoramic Vision: Sensors, Theory, and Applications. pp. 2-38. Springer, Heidelberg(2001). Last accessed Aug. 20, 2010, 7 pages.
Yagi, Y.: Omnidirectional Sensing and Its Applications. IEICE Trans. Inf. Syst. 82(3), 568-579 (1999).
Swaminathan, R., Grossberg, M.D., Nayar, S.K.: Non-single Viewpoint Catadioptric Cameras: Geometry and Analysis. Int. J. Comput. Vision 66(3), 211-229 (2006). Last accessed Aug. 20, 2010, 39 pages.
Geyer, C., Daniilidis, K.: Paracatadioptric Camera Calibration. IEEE Pattern Anal. Mach. Intell. 24(5), 687-695 (2002) Last accessed Aug. 20, 2010, 10 pages.

(Continued)

*Primary Examiner* — Yon Couso
(74) *Attorney, Agent, or Firm* — Turocy & Watson, LLP

(57) ABSTRACT

The subject innovation provides for systems and methods to facilitate obtaining an overall well focused catadioptric image by combining portions of multifocal images in a fast and reliable manner. The resulting images benefit applications where high image resolutions are desirable over a large field of view. In an aspect, shallow depth of field imaging with respect to the caustic volume boundary can be correlated to annular shaped best focal regions for multifocal image sets. These annular regions are generally independent of scene composition and generally dependant on optical system parameters allowing fast computation of overall well focused output images comprising concentric best focused annulus areas from a multifocal image set.

25 Claims, 12 Drawing Sheets

(56) References Cited

OTHER PUBLICATIONS

Kim, C.: Segmenting a Low-Depth-of-Field Image Using Morphological Filters and Region Merging. IEEE Trans. Image Processing 14(10), 1503-1511 (2005) Last accessed Aug. 20, 2010, 9 pages.

1. S. Baker and S. K. Nayar, A theory of single-viewpoint catadioptric image formation, International Journal of Computer Vision, vol. 35, No. 2, pp. 1-22, 1999. Last accessed Aug. 20, 2010, 22 pages.

Hasinoff, S.W., Kutulakos, K.N.: Light-Efficient Photography. In: Forsyth, D., Torr, P., Zisserman, A. (eds.) ECCV 2008, Part IV. LNCS, vol. 5305, pp. 45-59. Springer, Heidelberg (2008). Last accessed Aug. 20, 2010, 14 pages.

Accowle Co. Ltd.: Production list, http://www.accowle.com/english/products.html. Last accessed Aug. 20, 2010, 1 page.

R. Swaminathan, Focus in catadioptric imaging systems, in Proceedings of IEEE International Conference on Computer Vision, Oct. 2007, pp. 1-7. Last accessed Feb. 23, 2010, 7 pages.

Telecentric lens, http://en.wikipedia.org/wiki/Telecentric_lens. Last accessed Aug. 20, 2010, 3 pages.

Ying, X., Hu, Z.: Catadioptric Camera Calibration Using Geometric Invariants. IEEE Pattern Anal. Mach. Intell. 26(10), 1260-1271 (2004). Last accessed Aug. 28, 2010, 12 pages.

Agarwala, A., et al.: Interactive Digital Photomontage. In: SIGGRAPH, pp. 294-302. ACM, New York (2004). Last accessed Aug. 20, 2010, 9 pages.

Hecht, E.: Optics. Last accessed Aug. 20, 2010.

* cited by examiner

WELL FOCUSED CATADIOPTRIC IMAGE ACQUISITION

TECHNICAL FIELD

The presently disclosed subject matter relates to the art of optics and more specifically to the art of imaging in catadioptric optical systems.

BACKGROUND

Curved mirrors are known as catoptrics and conventional lenses systems are known as dioptrics. Devices consisting of both are known as catadioptrics. Catadioptric systems can offer several advantages over conventional lens systems. Catadioptrics can be employed to shorten the overall optical path length as compared to standard dioptric lens stacks. This aspect makes catadioptrics popular in systems such as telescopes and in telescopic camera lenses since the length and weight of a catadioptric lens is significantly less than the length and weight of a corresponding dioptric lens system. Telephoto or telescopic catadioptric mirrors are typically concave and are rotationally symmetric around the optical axis of the lens.

Similarly, catadioptric systems can give a wide field of view by employing convex quadric mirrors. In catadioptric systems with rotationally symmetric convex quadric mirrors, panoramic images can be captured directly. Increasingly, these panoramic catadioptric systems are being employed for machine, robot and computer vision systems, including military applications. Specific mirror surface shapes are selected to generate related image attributes in some catadioptric systems. Further, software is generally employed to deconvolve acquired images from these types of catadioptric systems, e.g., converting a 'circular image' into a more conventional panoramic image.

Furthermore, in conventional dioptric lenses, the camera lens is focused at distances correlated to the depth of an object in an imaged scene. In contrast, catadioptric systems generally use a camera lens focused on a virtual object formed by reflection of an imaged scene object on a mirror. Where a rotationally symmetric quadric mirror is employed in the catadioptric system, the infinite range of scene depth is limited to a finite depth range of the virtual object points. The finite volume of the virtual object space is known as the caustic volume. Typically, a camera in this type of catadioptric system is placed such that the depth of field (DOF) captures the caustic volume. Thus, these cameras generally have high f-numbers (i.e., small apertures) and an increased distance between the imaging sensor and the virtual objects such that the DOF is sufficient to capture the majority of the caustic volume resulting in an image that is in focus. As these catadioptric systems evolve into even more compact systems or where larger apertures are needed (e.g., low light conditions), the DOF can become reduced so as not to capture the enough of the caustic volume to generate an overall well focused image. A shallow DOF can result in areas of the image being in focus while other areas are out of focus in catadioptric imaging.

The above-described deficiencies of conventional imaging are merely intended to provide a brief overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the disclosed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Catadioptric systems are popular in part because they can capture a wide field of view with a relatively compact system. As catadioptric systems continue to shrink and are used in more challenging optical conditions, output images with poorly focused regions can result from loss of depth of field. By properly modeling and combining focused regions of multifocal image sets, a generally well focused output image can be generated.

In an aspect, systems can be configured to generate an output image from a set of multifocal input images by, at least in part, analyzing multifocal input image data of a set of multifocal input images to determine best focused image regions. A best focused image region can be modeled as an annulus. An output image can be generated by including the annulus shaped best focused image regions from images in the set of multifocal input images.

In another aspect, methods for generating an output image from a set of multifocal input images can include accessing data relating to the set of multifocal input images to determine best focused points (BFPs) for the set of multifocal images. An optimization algorithm can then be employed to estimate, based, at least in part, on the BFPs, parameters for an annular model related to the best focused image regions in the set of multifocal images. An output image can then be generated based, at least in part, on the parameterized annular model.

In a further aspect, methods for generating an output image from multifocal image sets can be made faster by incorporating previously determined annular models. Data related to a first multifocal input image set and associated with a first set of known optical parameters can be analyzed to model the best focused image regions as a set of annuluses. This model information can be stored and correlated with the optical parameters. Other multifocal image sets acquired with the same or similar optical parameters can then access the existing model when generating an output image.

To the accomplishment of the foregoing and related ends, the disclosed subject matter, then, comprises one or more features hereinafter described. The following description and the annexed drawings set forth in detail certain illustrative aspects, however, these aspects are indicative of but a few of the various ways in which the principles of the one or more embodiments may be employed. Other aspects, advantages and novel features of the subject disclosure will become apparent from the following detailed description when considered in conjunction with the drawings.

DETAILED DESCRIPTION

Figure 1:
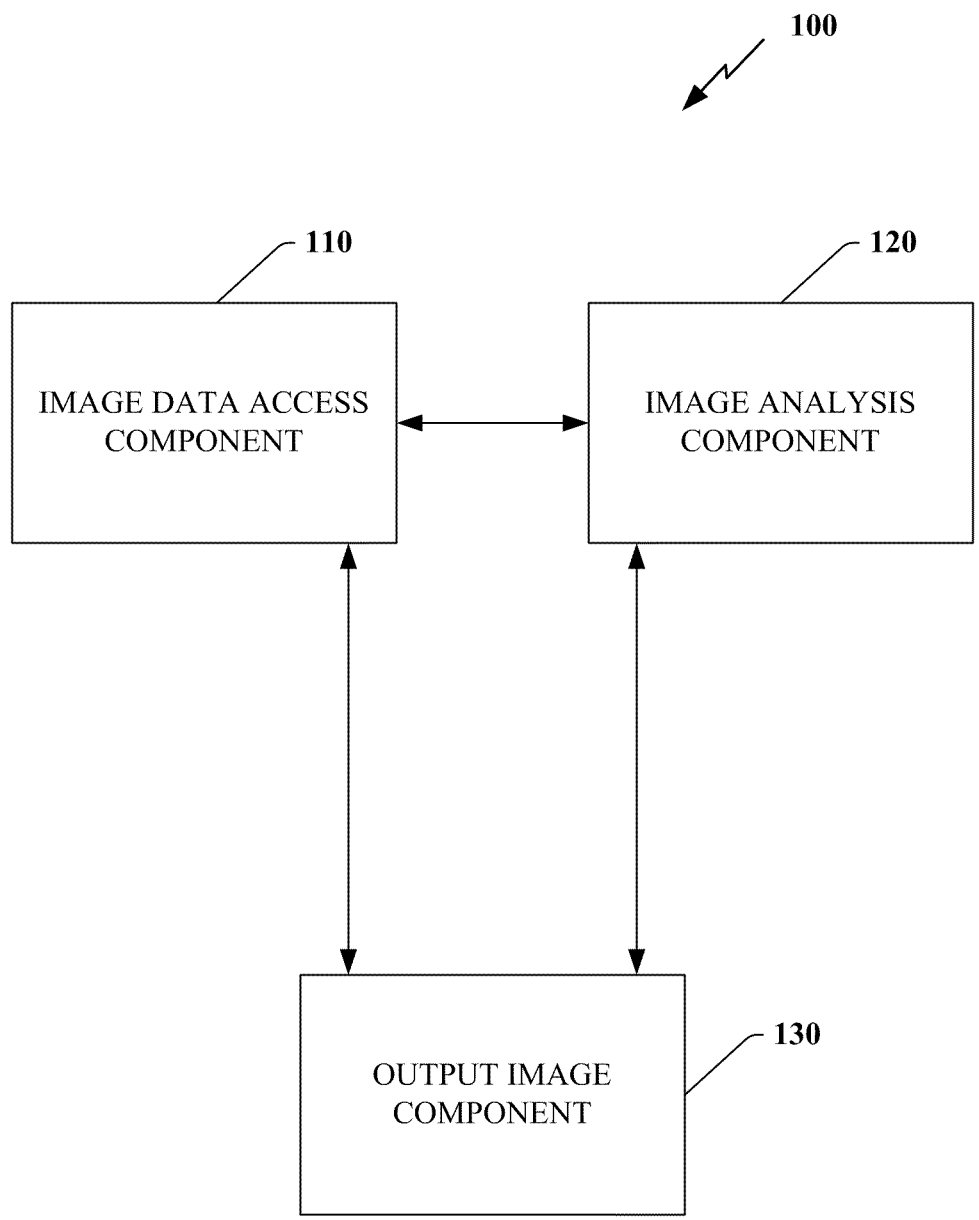
FIG. 1 illustrates a system to generate a well focused image from a set of multifocal images.

Various embodiments of the subject disclosure are now described with reference to the drawings, wherein like reference numerals are used to refer to like elements throughout. In the following description, for purposes of explanation, but not limitation, numerous specific details are set forth in order to provide a thorough understanding of one or more non-limiting embodiments. It is evident, however, that such matter can be practiced without these specific details. In other instances, well-known structures and devices are shown in block diagram form in order to facilitate describing one or more embodiments.

As used in this application, the terms "component," "handler," "model," "system," and the like are also intended to refer to a computer-related entity, either hardware, a combination of hardware and software, software, or software in execution, in addition to electro mechanical units. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems by way of the signal).

Catadioptric systems having rotationally symmetric convex curved mirrors and conventional lens based cameras have been increasingly popular in many computer vision applications to capture a wide field of view. As these systems become more compact or are used in more demanding optical environments it is increasingly common to observe a catadioptric image having some image regions well focused and some other regions not well focused, which can complicate any subsequent image processing procedures. While most existing work on catadioptric systems has focused on mirror design, calibration, or applications, little attention has been paid towards understanding the effects of the curved mirror on the formation of a well-focused image. By combining a set of multifocal images, a well focused image within which objects are clearly focused can be obtained.

It is understood that if the depth of field (DOF) of a camera can cover the depth of an object, the object can appear clearly focused in the captured image. In a catadioptric system, however, instead of imaging the object, the camera captures the virtual object formed in the reflections on a mirror. The positions of virtual objects in a catadioptric system are limited to a finite extent of space known as the caustic volume. Therefore, as long as the camera DOF is wide enough to contain the caustic volume, objects can be captured by just one single focused catadioptric image.

However, there are still many cases where the camera DOF is not wide. One example is a compact catadioptric system, wherein the camera is mounted at a close distance to the convex rotationally symmetric mirror. According to geometrical optics, a close object distance is related to a decreased DOF. Similarly, systems where the camera employs larger apertures to allow for more efficient photography also lead to decreased DOF. In these situations, object points whose virtual object points within the caustic volume are beyond the DOF of the camera can appear out-of-focus in a resulting image.

Conventional systems have not adequately addressed catadioptric systems with a DOF less than the caustic volume. Thus, conventional catadioptric systems face a boundary to decreasing size or light efficiency. As such, compact catadioptric systems with the camera mounted close to the mirror or optically efficient catadioptric systems with larger apertures generally produce images with out of focus regions in captured images.

As an improvement to conventional catadioptric systems, wherein a single image does not capture all objects in focus for shallow DOF conditions, the presently disclosed subject matter achieves a well focused image by combining a set of multifocal images. In contrast to conventional techniques for non-catadioptric systems that typically segment the best focused image patches from multifocal images and merge them into an output image, the presently disclosed subject matter does not evaluate a local focus measurement through the entire set of images as these approaches can be time consuming and error prone. Rather, the geometric optics in catadioptric systems with a rotationally symmetric mirror generate multifocal images with focused regions that can be modeled by a series of neighboring concentric annuluses. The best focused image regions can then be easily combined into a final well focused image. The model parameters are also independent of the scene structure and therefore once the parameters are determined, no additional model computation is needed for different scenes when the optical settings remain static, allowing for fast performance.

The disclosed subject matter provides for system(s) and method(s) relating to generating a well focused image from a set of multifocal images. In a catadioptric system, real object points are first reflected by a rotationally symmetric quadric curved mirror and form virtual object points. A camera captures these virtual object points to form an output image. For this output image to be well focused, image regions corresponding to the real object points will have virtual object points within the camera depth of field (DOF). This virtual object space is known as the caustic volume. As such, caustic volume is the space between the mirror surface and a virtual surface known as the caustic volume boundary (CVB).

In experiments related to the presently disclosed subject matter, it has been determined that the spatial distribution of virtual object points within the caustic volume is non-uniform and the majority of virtual object points can be regarded to locate on or near the CVB. The locations of virtual object points for a variety of quadric mirror based catadioptric systems, whose eccentricities range from 0.8 to 1.2, heights from the mirror apex to the camera lens range from 5.9 mm to 114.7 mm, and the diameters of the mirror range from 4.6 mm to 136.0 mm were calculated in these experiments. This set of parameters covers a typical production list of catadioptric sensor producers such as ACCOWLE Co. Ltd. According to the computation, when an object point is sufficiently far (e.g., farther than 1 meter) from the system, it will have its virtual object point located within a narrow neighborhood of the CVB (e.g., within 5% of the distance from CVB to the mirror surface). For applications wherein the points of interests usually lie at a sufficient distance (e.g., farther than 1 meter), the great majority of virtual object points can be considered to be effectively located on the CVB.

Figure 3:
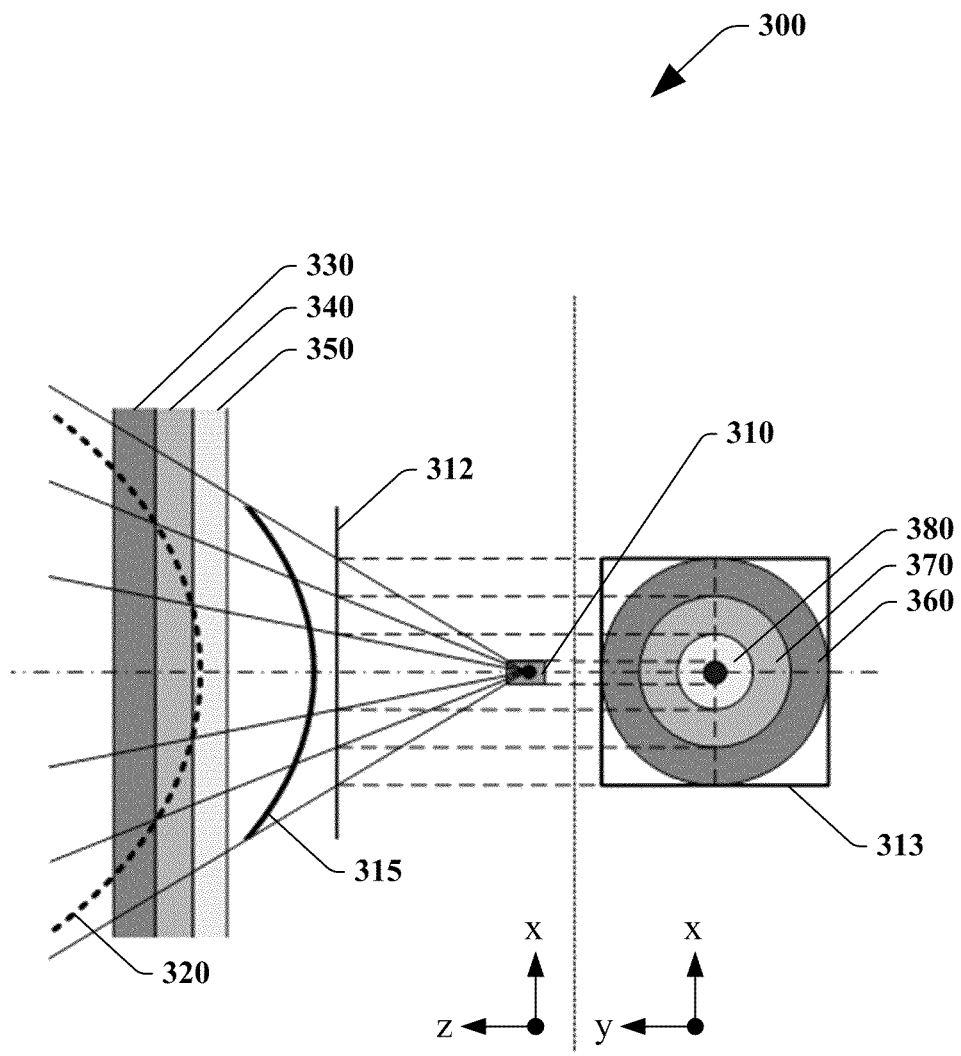
FIG. 3 is a diagram of a caustic volume boundary in relation to shallow depth of field regions and best focused image regions.

Following this conclusion, the virtual object points that can be clearly focused are located on or near the CVB surface and between the front end and rear end of the DOF, which can be modeled as two parallel planes perpendicular with the optical axis (similar to aspects of FIG. 3, for example). As the catadioptric system, and hence the CVB, is rotationally symmetric, the projection of this region onto a sensor (e.g., CCD sensor, film, etc.) is annular in shape. Therefore, an annulus can be used to model the shape of a well focused region in a catadioptric image. Further, because the CVB and DOF are determined only by the mirror shape and the optical system parameters associated with a particular optical setup, the shape of well focused region can be considered independent of the real 3D scene structures in stark contrast to conventional dioptric systems.

Where a catadioptric system is configured to have a DOF sufficient to capture the entire caustic volume a single annulus can be used to model the well focused region (e.g., the annulus extends from the optical axis to the extents of the image whereby there is but a single focused disk for the entire image). However, the evolution of catadioptric systems into smaller packages and more optically efficient systems often results in a DOF shallower than the caustic volume. Thus, as previously stated, conventional catadioptric systems are prone to images with out of focus regions where the DOF is shallower than the caustic volume. This can result, for example, from locating the camera close to the virtual objects so as to reduce the DOF, or, for example, by employing an aperture for efficient imaging that results in a shallow DOF. The disclosed subject matter accommodates shallow DOF imaging systems by combining the best focused regions from a set of multifocal images into a composite output image that is well focused overall.

FIG. 1 illustrates a system 100 to generate a well focused image from a set of multifocal images. System 100 can include an image data access component 110. Image data access component 110 can facilitate access to image data directly from an imaging device (not illustrated) or to stored image data (e.g., raw image files, processed image files, image analytical data, etc.). Image data access component 110 can further comprise a memory for storing image data.

Further image data access component 110 can facilitate accessing image data stored on memory components that are not part of image data access component 110 (not illustrated). These memory components (not illustrated) can be local, remote and/or distributed. Stored image data can include multifocal image data.

A multifocal image is an image that has the same scene content as another multifocal image but has a different focal distance setting. Thus, a multifocal image set is a set of images taken at the same view point for the same scene, yet with different focal distance settings $\{f(I_1)\}$, where $f(I_1)<f(I_2)< \ldots <f(I_N)$, for N multifocal images. For example, a multifocal image set can be captured from a camera with an image-space telecentric feature, such that the scene content in each image is the same. In practice, many off the shelf cameras are equipped with a focus-bracketing function, which can be easily employed by many existing catadioptric systems to improve the image quality in terms of focus in accordance with the currently disclosed subject matter. In an aspect, focus-bracketing is a sequential multi-exposure process that is not truly multifocal as there is a minimal temporal difference from image to image in a set, which might hinder the approach in dynamic environments. However, this problem is diminishing as newer cameras are ever increasing their frame rate. Further, true multifocal images can be captured with more complex dedicated optical imaging equipment, for example, those employing beam splitters, folded optical paths, and multiple imagers for multiple focal planes in a simultaneous set of images in telecentric systems.

Image analysis component 120 can be communicatively coupled to image data access component 110. In an aspect, image analysis component 120 can determine the best focused region in an image. This best focused region can be annular in shape for an image from a catadioptric system. For a set of multifocal images, image analysis component 120 can determine the best focused regions from each image in the set, such that neighboring concentric annuluses, from the central to the peripheral, can be ordered. The determined best focused region information can be made accessible to output image component 130.

Output image component 130 of system 100 can be communicatively coupled to image analysis component 120 and image data access component 110. Output image component 130 can employ determined best focused region information to facilitate generating an output image that is well focused and comprises the best focused regions from one or more of the multifocal images comprising a multifocal image set.

In an aspect, the best focused regions of an image can be related to the overlap of the depth of field (DOF) and the caustic volume boundary (CVB) for an image. The CVB can be denoted as $V \subset \mathbb{R}^3$. Also, let $I=\{I_i\}$ be a set of N multifocal catadioptric images, which is taken at the same view point for the same scene, yet with different focal distance settings $\{f(I_i)\}$, where $f(I_1)<f(I_2)< \ldots <f(I_N)$. Denote the DOF of $I_i$ as $d(I_i)$. To make sure scene objects are in focus in at least one of the images comprising the set of multifocal images, I should satisfy the following conditions: (1)

$$d(I_p) \cap d(I_q) \neq \emptyset \quad \text{for,} \quad \forall I_p, I_q \in I, q=p+1 \quad \text{and} \quad (2)$$
$$V \subset \cup_{i=1}^N d(I_i).$$

Condition (1) can be met by making the focal distance increment at sufficiently small steps. Condition (2) can be met by letting $d(I_1)$ lie before V and $d(I_N)$ lie behind V, (e.g., both the first and last image are overall out-of-focus images.

The images of interest in I are a subset of M partly focused images $I'=\{I'_k\} \subset I$ that satisfy $d(I'_k) \cap V \neq \emptyset$. Also assume $f(I'_1)$ <f(I'$_2$)<...<f(I'$_M$). As V is a limited space, M can be expected to be a small number. Denote the circular image region corresponding to the mirror surface as s(I'). Note that because I'⊂I, s(I)=s(I'). It can be seen that part of the image domain of s(I') would be in focus in at least one of the images comprising I'.

The best focused regions in I' can be modeled by M neighboring concentric annuluses. From the central to the peripheral, let s(I') be divided into M concentric annular areas $$A=\{A_k\} \text{ where } \cup_{k=1}^{M} A_k = s(I') \text{ and } A_p \cap A_q = \emptyset, \text{ for } \forall A_p \neq A_q, A_p, A_q \in A.$$

Determined by the order of f(I'$_k$), $A_k$ is the best focused in image I'$_k$. Each annulus $A_k$ can be described by the two concentric circles enclosing it, whose radii are $r_{k-1}$ and $r_k$. Therefore, the model A={$A_k$} can be parameterized as a set of M+1 radii {$r_0, r_1, r_2, \ldots, r_M$}, where $r_0 < r_1 < r_2 < \ldots < r_M$. Here, $r_0$ is the radius of the circular area in the central part of the image where the scene can be occluded by the camera itself and $r_M$ is the radius of the circular view boundary of the mirror surface in the image. As $r_0$ and $r_M$ are determined by the optical system setup parameters, there are M−1 radii to be estimated, which is denoted as R={$r_1, r_2, \ldots, r_{M-1}$}. The final output image $\hat{I}$ is simply obtained by combining the best focused area in I'$_k$ so that $\hat{I}(A_k)=\hat{I}_k(A_k)$. Further, as R is determined by the optical system setup and focal distance settings of I'$_k$, the same R is applicable for other images of arbitrary scenes without regard to their different real 3D structures, so long as those images are taken with the same optical system parameters, as verified by related experiment (see also FIG. 6).

As stated previously, the majority of best focused points will lie near the CVB for many sets of images were the real objects are distant from the quadric mirror. Further, the selection of a best focus region is related to some quantification of which areas are best focused in each image of a set such that appropriate radii can be determined and a set of concentric annuluses can be reached for generating a final output image that is well focused. As will be appreciated by one of skill in the art, numerous techniques can be employed for determining which regions in each image of a set are the best focused. Similarly additional techniques can be applied to determining the precise radius of an encompassing annular region in each image. One of skill in the art will further appreciate that all such techniques are within the scope of the currently disclosed subject matter for all disclosed systems and methods generating a focused image from a set of multifocal images for catadioptric systems.

In one embodiment, a model estimation technique can rely on the set of multifocal images I as previously disclosed. The technique can identify a set of partly focused images, I'. Then the set of radii, R, can be estimated by employing an optimization approach to fit the estimation to the observed data based on a predetermined threshold.

A partly focused image is identified by examining whether it contains a number of best focused image points among all images in the multifocal image set. To evaluate the degree of focus for a point p∈s(I) in image $I_i$, a measurement F(p;$I_i$) is maximized. For example, the measurement F(p;$I_i$) can be a high order statistical measurement which is well appreciated in the image processing arts. Further, one of skill in the art will appreciate that other measurements can be made and maximized without departing from the scope of the disclosed subject matter and that use of an alternate measurement is considered herein disclosed. For example, changes in computational efficiency and performance may indicate that a more or less rigorous measurement be used. Denoting P={$p_j$}⊂s(I) as a set of uniformly distributed sample points to use for optimization, then $I_w$ contains $p_j$ as a best-focused point (BFP) when F($p_j$;$I_w$)=max$_{i=1}^N$F($p_j$;$I_i$). Partly focused images are then identified as the images that have a significantly larger number of BFP. For example, the threshold can be one half of the largest number of BFP contained in an image.

Given the set of M partly focused images I'={I'$_t$}, the model parameters to be estimated are: R={$r_1, r_2, \ldots, r_{M-1}$}. An error function between the model estimation, R, and the observed image, I', can be defined as:

$$E(R) = \sum_{k=1}^{M} \sum_{p_j \in P \cap A_k} \delta(\arg\max_{i=1}^{M} F(p_j: I'_i)) \neq k)$$

where δ(s)=1 when s is true and δ(s)=0 when s is false. P={$p_j$}⊂s(I') is a set of uniformly distributed sample points in s(I'). In this function, arg(max$_{i=1}^M$F($P_j$;I'$_t$)) gives an index of the image where point $p_j$ in area $A_k$ is considered best focused by the focus measurement in I'. Recalling that any point $p_j$ in area $A_k$ must be best focused in image I'$_k$ illustrates that E(R) counts the number of sample points whose image observations are not consistent with the estimation. Thus, the optimal model estimation, $\hat{R}$={$\hat{r}_1, \hat{r}_2, \ldots, \hat{r}_{M-1}$}, is achieved by minimizing E(R) such that E($\hat{R}$)=min$_R$(E(R)). Then, $\hat{R}$ is obtained with the following procedures:

(1) For each $p_j$ find B($p_j$)=arg(max$_{i=1}^M$F($p_j$;I'$_t$)).
(2) Denote the distance from a pixel p to the image center as rad(p). For pixels that satisfy B($p_j$)=k, the average of rad($p_j$) is a value a(k) between $r_{k-1}$ and $r_k$. As $r_0 < r_1 < r_2 < \ldots < r_M$, some erroneous estimations of B($p_j$) can be rejected by iterating through:
(2)(a) Estimate a(k) for each $A_k$.
(2)(b) Find the points that simultaneously satisfy:
(2)(b)(i) a(k)<rad($p_j$)<a(k+1); and
(2)(b)(ii) B($p_j$)<k or B($p_j$)>k+1.
(2)(c) If no points are found in (b) stop iterating, or if points are found in (b) do (d).
(2)(d) Eliminate the points found in (b) and return to (a).
(3) For the model R={$r_1, r_2, \ldots r_{M-1}$} to be estimated, $r_k$∈(a(k), a(k+1)).
Where the solution space for R is not large, the entire solution space can be traversed to find a global optimal estimation $\hat{R}$ to minimize E(R).

This technique works well even in the presence of noise because ordering constraints are used in part (2) and an optimal estimation is searched.

As previously stated, after determining the best focused regions, such as, for example, by the disclosed model estimation technique, these regions can be combined to generate an output image that is well focused. Let $\hat{I}$ be a well focused image such that $\hat{I}(A_k)$=I'$_k(A_k)$. Further, the image pixels in I'$_k$ near $A_k$ can be assumed to be well focused because d(I'$_p$)∩d(I'$_q$)≠∅ for ∀I'$_p$, I'$_q$∈I'.

Figure 2:
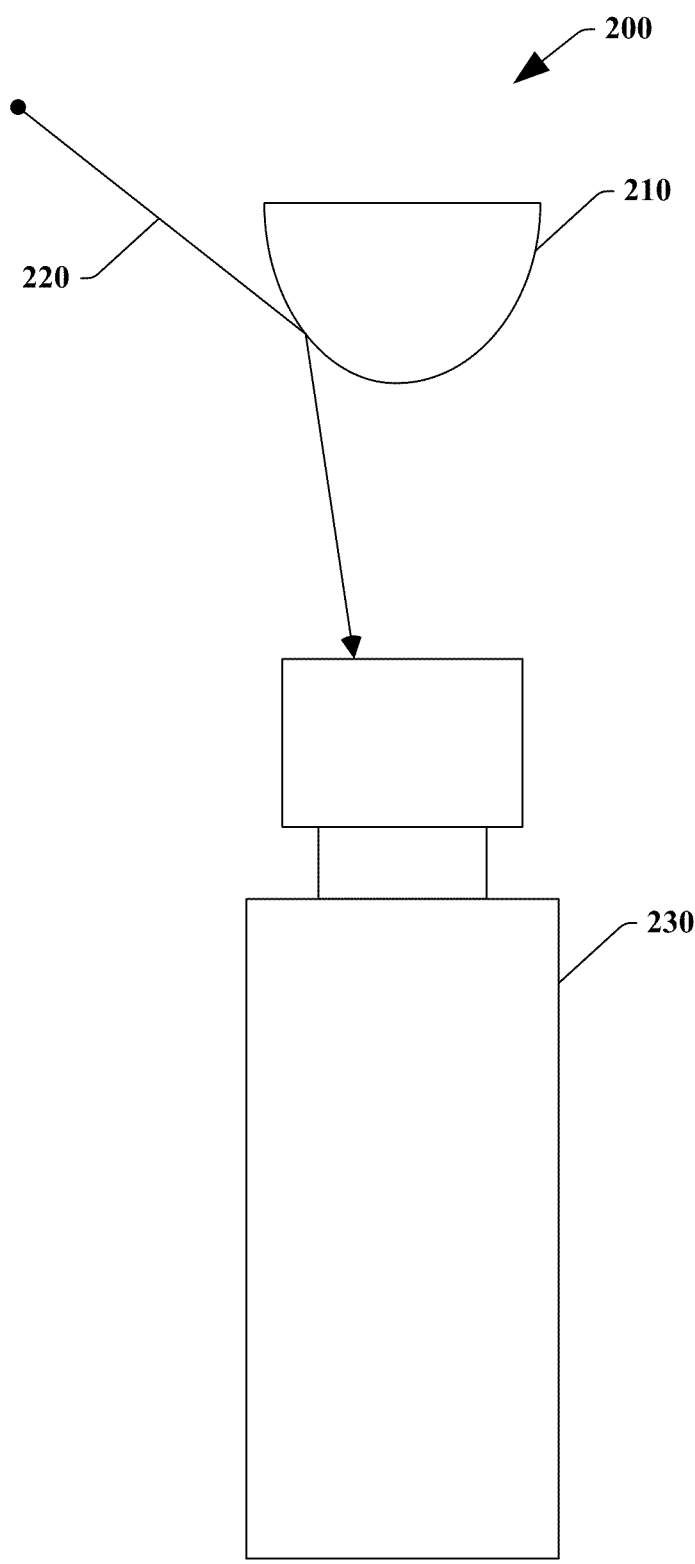
FIG. 2 illustrates a catadioptric camera system that can facilitate generating a focused image from a set of multifocal images.

FIG. 2 illustrates a catadioptric camera system 200 that can facilitate generating a focused image from a set of multifocal images. System 200 can include a rotationally symmetric quadric mirror 210. Mirror 210 can reflect light 220 from a point in real space into a camera 230. According to basic optical principals, the reflected real image will cause the camera to focus on a virtual object said to be resolved within the mirror 210. As stated herein, the disclosed subject matter can facilitate imaging the caustic volume in multifocal image sets. The images in the set can include in focus image regions modeled as a set of in focus annuluses across the set of images such that merging the in focus regions into a single image provides a well focused image even where the DOF of the imager is less than the caustic volume.

Camera 230 of system 200 can comprise a system (not illustrated) that is similar to or the same as system 100 to facilitate the generation of a focused image from a set of multifocal images captured by camera 230 in system 200. As previously stated, where the optical parameters of system 200 are known (e.g., known mirror 210, known distance between mirror 210 and camera 230, known focal distances for the set of multifocal images captured by camera 230, etc.) the R values can be automatically applied without recalculation to additional multifocal image sets captured by camera 230. Where modern camera systems have memory chips (not illustrated) R values for specific optical setups can be stored and accessed to reduce computation time when generating output images from new multifocal image sets wherein the optical setup parameters are the same as a stored set of parameters.

In another embodiment, system 200 can comprise image processing components (not illustrated) that are similar to or the same as system 100 which can be located separate from camera 230 to facilitate the generation of a focused image from a set of multifocal images captured by camera 230. These components can be communicatively coupled to camera 230 and be located locally or distant from the remainder of system 200. This embodiment can facilitate centralized processing of images acquired by system 200. Further, where multiple instances of system 200 exist, they can share the image processing resources. For example, a distributed security camera system can have a plurality of catadioptric cameras deployed in disparate locations. These cameras can feed multifocal image sets back to a central image repository. This image repository can be accessed by the image processing system and resulting well focused output images can be accessed for each camera from a remote location. This can allow, for example, a border patrol officer to remotely check a plurality of security cameras from the field over a mobile device. Further, where each camera has a fixed optical setup, image processing can be fast because the R values for each camera setup can be stored and accessed to avoid needing to recalculate best focused regions.

FIG. 3 is a diagram 300 of a caustic volume boundary in relation to shallow depth of field regions and best focused image regions. Diagram 300 includes a camera 310 and a rotationally symmetric quadric mirror 315 representing a catadioptric imaging system similar to or the same as that illustrated in system 200. Assuming a Euclidean coordinate system x-y-z with its z axis parallel with the optical axis of the catadioptric system, as the system is rotational symmetric around the optical axis (dot-dash line), the analysis can be conducted in 2D. The left part of FIG. 3 (separated by the vertical dash line) shows the 2D profile of the system on the x-z plane. The camera 310 images mirror surface 315 (capturing the virtual object space). The right part of FIG. 3 shows the projection of image plane 312 of the camera on the x-y plane with image content 313. As stated previously, the distribution of virtual object points is non-uniform and is concentrated near the CVB 320 for most object points of sufficient distance from the mirror (not illustrated). Regions 330, 340, and 350 illustrate shallow DOF planes intersecting the CVB 320. Wherein the system represented by diagram 300 is rotationally symmetric around the optical axis (dot-dash line), the projections of the shallow DOF regions 330, 340 and 350 are annuluses 360, 370 and 380 respectively.

An exemplary multifocal image set (not illustrated) for diagram 300 would comprise images focused in each of regions 330, 340 and 350 (and likely several others not having any in-focus content by being focused closer than 350 or farther than 330). Exemplary image processing for the example image set can generate an output image comprising the in-focus region 360 from the image related to 330, the in-focus region 370 from the image related to 340, and the in-focus region 380 from the image related to 350, to form a well focused image.

The aforementioned systems have been described with respect to interaction between several components. It should be appreciated that such systems and components can include those components or sub-components specified therein, only some of the specified components or sub-components, and/or additional components. Sub-components can also be implemented as components communicatively coupled to other components rather than included within parent components. Further yet, one or more components and/or sub-components can be combined into a single component providing aggregate functionality. Moreover, components can be configured to be specific purpose components either alone or when in combination with other specific purpose or general purpose components. The components can also interact with one or more other components not specifically described herein for the sake of brevity, but known by those of skill in the art.

Figure 4:
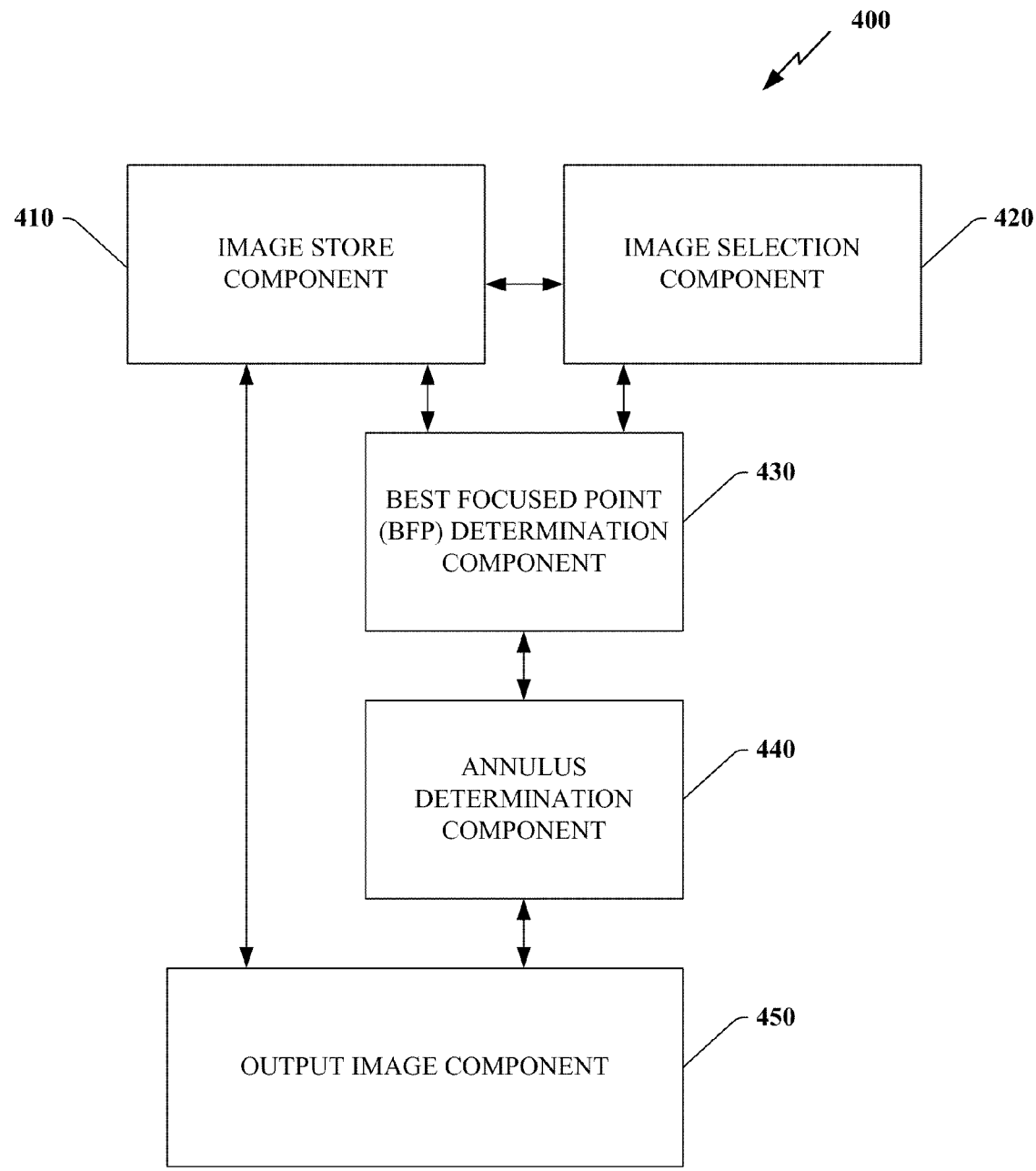
FIG. 4 illustrates a system to generate a well focused image from a set of multifocal images.

FIG. 4 illustrates a system 400 to generate a well focused image from a set of multifocal images in accordance with the disclosed subject matter. System 400 can include image store component 410 that can be the same as or similar to image data access component 110 of system 100. Image store component 410 can be communicatively coupled to output image component 450 of system 400, which can be the same as or similar to output component 130 of system 100. Further, components 410 and 450 can be distributed components in a manner similar to that described in system 100.

Image store component 410 can be communicatively coupled in system 400 to best focused point (BFP) determination component 430. BFP determination component 430 can determine a set of best focused points in each image in a multifocal image set stored in the image store component 410. A best focus point can be a particular pixel that is best focused in a particular image as compared to that same pixel in other images of a multifocal image set. As previously stated with regard to analysis techniques herein, one of skill in the art of image analysis will appreciate that a large selection of measurement techniques exist for determining the degree of focus for a pixel in an image. By applying these types of techniques across a set of multifocal images, the same point is analyzed for focus quality in a series of images having the same scene content but different focal planes. Thus, any focus determining technique can be employed within the scope of the current disclosure and all such techniques are within the scope of the present disclosure. A previous example of high order statistic analysis was described herein and remains a valid exemplary analysis technique. Exemplary techniques are described with regard to system 100 and such exemplary techniques can similarly apply to system 400. In an aspect, all points can be solved for. In another aspect, a subset of points can be solved for. BFPs can be stored as a type of image data on image store component 410.

Image store component 410 can be communicatively coupled to image selection component 420. Image selection component 420 can be communicatively coupled to BFP determination component 430. Image selection component 420 can determine a sub-set of images from a set of multifocal image data stored in component 410 such that each image in the selected image sub-set contains at least some portion of the image region that is generally well focused. This subset can be called a set of partially well focused (PWF) images.

This sub-set data can be stored at image store component 410. Further, this PWF image data can be accessed by BFP determination component 430. BFP determination component 430 can similarly determine a set of best focused points in each image of a PWF image set.

Annulus determination component 440 can be communicatively coupled to BFP determination component 430 in system 400. Annulus determination component 440 can access the determined best focused points in each image of the PWF image set as determined by BFP determination component 420. Annulus determination component 440 can determine a set of annuluses in the PWF image set such that the annuluses are neighboring and concentric across the plurality of images. Yet again, one of skill in the art will appreciate that any of a number of model parameter estimation and optimization techniques can be applied to making this determination and that all such techniques are within the scope of the present disclosure.

System 400 can further include output image component 450. Output image component 450 can be communicatively coupled to annulus determination component 440 to at least in part access information related to the determined concentric annuluses. Output image component 450 can selectively merge the image information related to each concentric annulus across the set of multifocal images to generate an image that is overall well focused.

Figure 5:
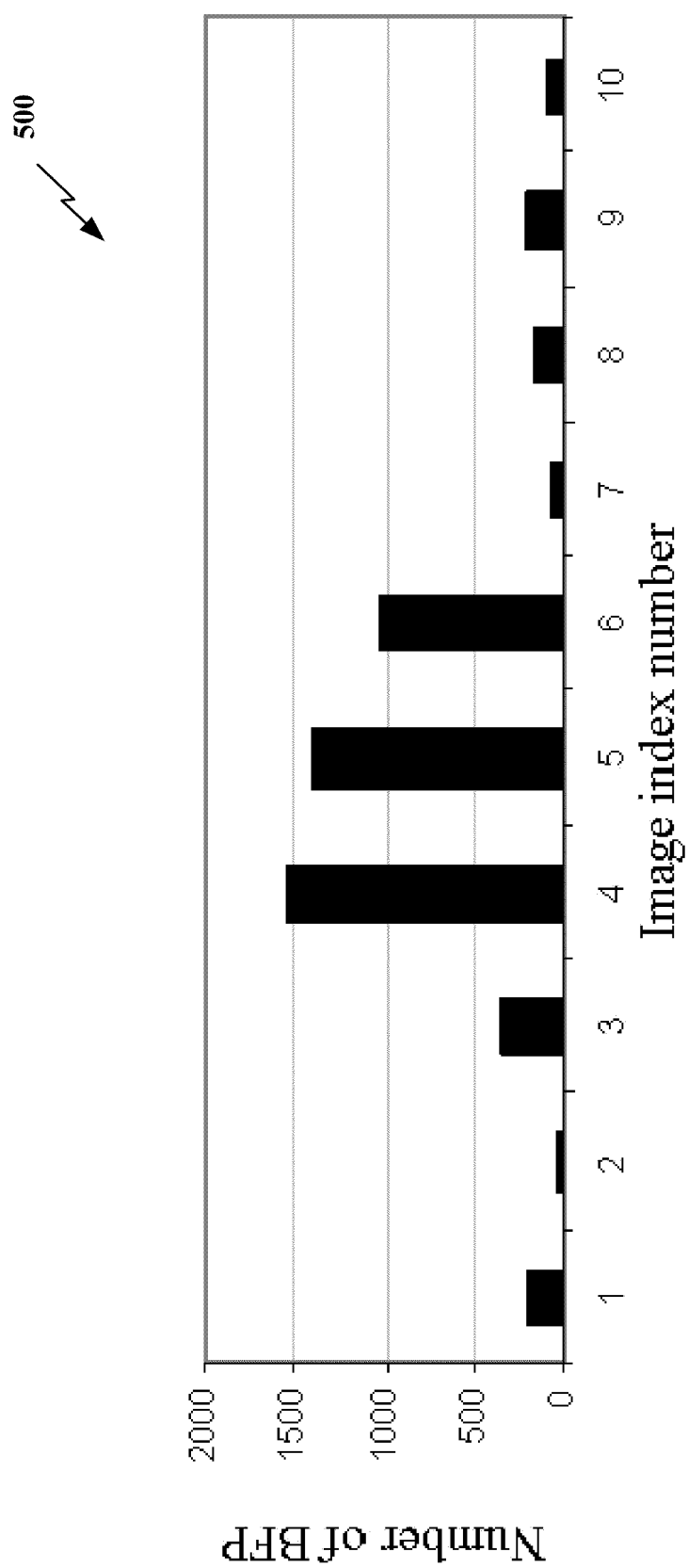
FIG. 5 is a graph illustrating an exemplary distribution of the number of best focused points in a set of multifocal images.

FIG. 5 is a graph 500 illustrating an exemplary distribution of the number of best focused points in a set of multifocal images. Graph 500 is provided for illustration purposes and should not be considered to limit the disclosed subject matter in any way. Graph 500 can be an example of a visualization of BFP data returned from a BFP analysis, for example, the BFP determination performed by BFP determination component 430 disclosed herein with regard to system 400. The graph 500 depicts images 4, 5, and 6, of a set of ten multifocal images, as having a significantly larger number of best focused points than the remaining multifocal images. This can indicate that the best focused regions of images 4, 5, and 6 would generate a well focused image if selectively combined. As an example, images 4, 5, and 6 can be selected as a set of partly well focused (PWF) images, for example, by the PWF image selection component 420 in system 400.

Figure 6:
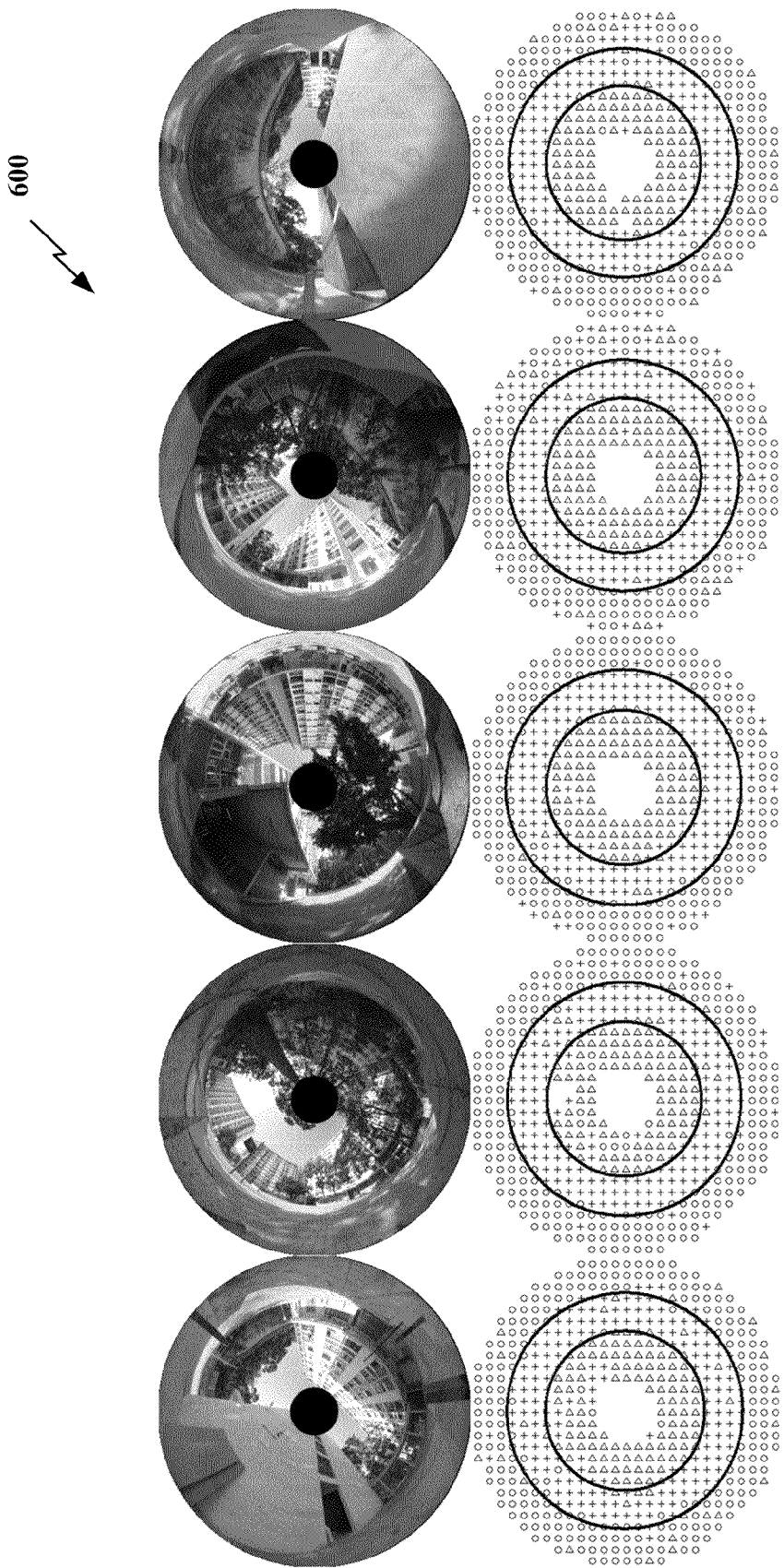
FIG. 6 is a graphic illustrating a plurality of different well focused images comprised of annular best focused regions from sets of multifocal images, each above the correlated best focused point analysis plot.

FIG. 6 is a graphic 600 illustrating five different well focused images comprised of annular best focused regions from five sets of multifocal images. Each set of multifocal images are captured with the same optical settings but for different scenes. To the right of each well focused image, the annular best focused regions are displayed (dark rings denote best focused region boundaries), overlaid with the correlated best focused point analysis plot (comprising the lighter grey '+', 'O', and "Δ" symbols). Graphic 600 is provided for illustration purposes and should not be considered to limit the disclosed subject matter in any way. Graphic 600 can be an example of combining well focused annular regions from a set of multifocal images to form a single overall well focused image. For example, the concentric annular regions (e.g., the dark concentric rings of the plots in the right-hand column) can be determined by the annulus determination component 440 of system 400 by analyzing the sets of best focused points (e.g., indicated by the lighter grey '+', 'O', and "Δ" symbols) in images 4, 5, and 6 as represented in graph 500 of FIG. 5. The plots of the best focused points (e.g., the '+', 'O', and "Δ" symbols) in each right-hand column image are intended to demonstrate one possible visualization of best focused point location within each annular region illustrated by uniformity of the iconic shapes within said region (e.g., a non-uniform icon shapes among a region of uniform icon shapes depicts a point that was best focused in a different image of the multifocal set). Graphic 600 generally illustrates that best focused image regions in a set of multifocal images are generally annular in shape and that they can be combined across a set of multifocal images to generate a well focused image. Also, graphic 600 generally illustrates that the annular model for different sets of multifocal images captured with the same optical settings remains the same, or nearly the same, and can be generally independent of the 3D structures of the viewed scene.

Figure 7:
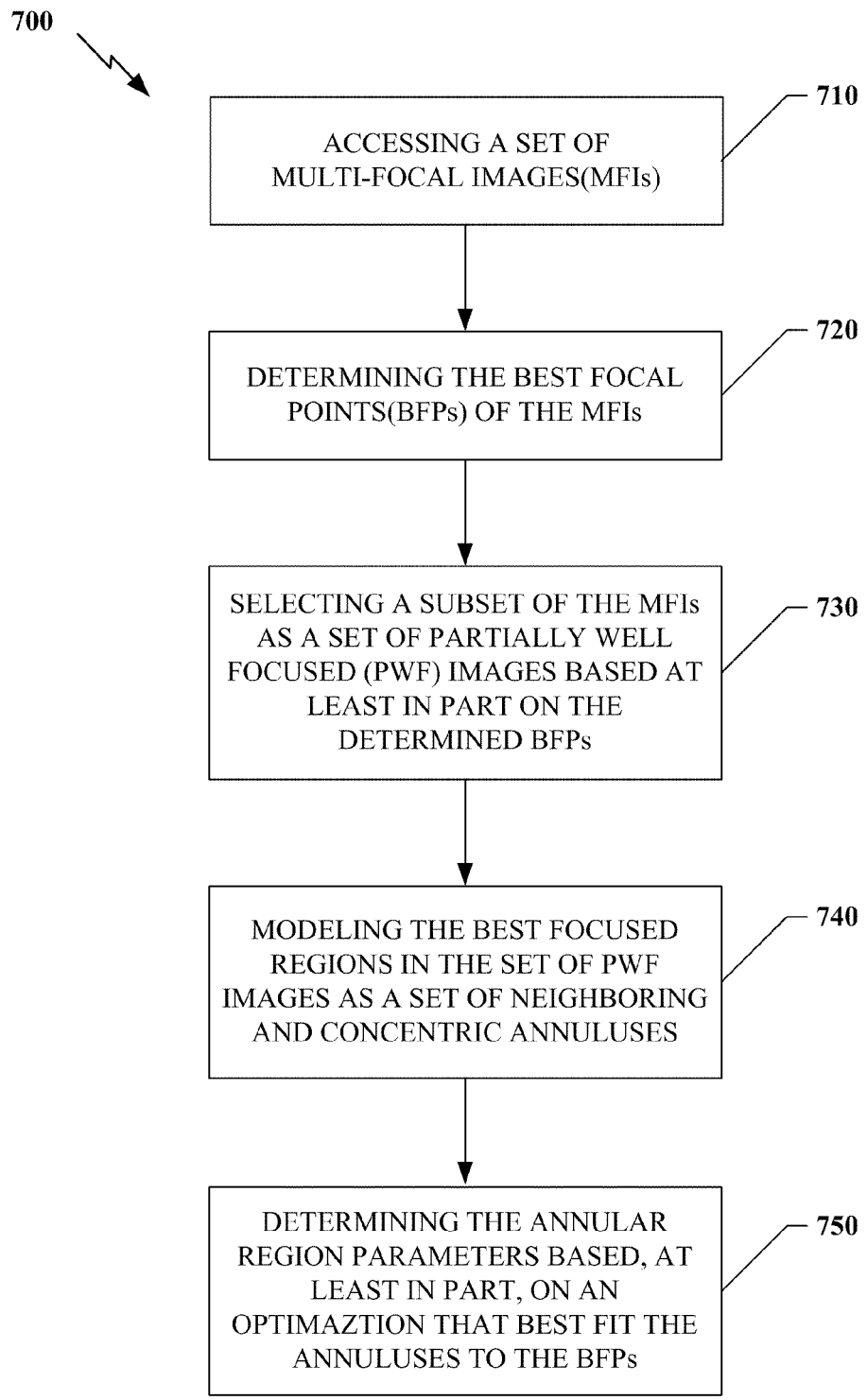
FIG. 7 illustrates a method for determining an annulus of best focused points within an image.
Figure 8:
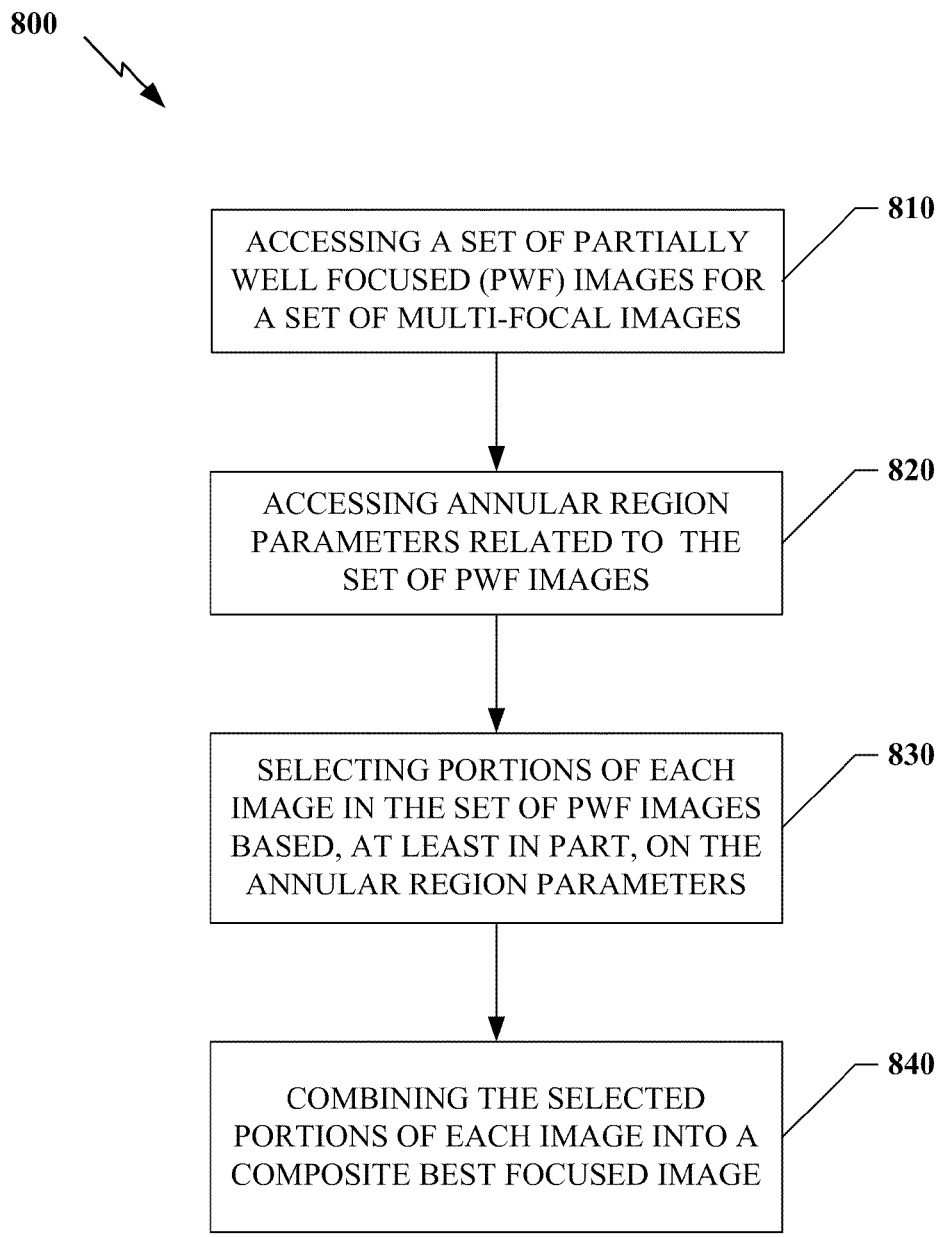
FIG. 8 illustrates a method for generating a well focused image from a set of multifocal images.
Figure 9:
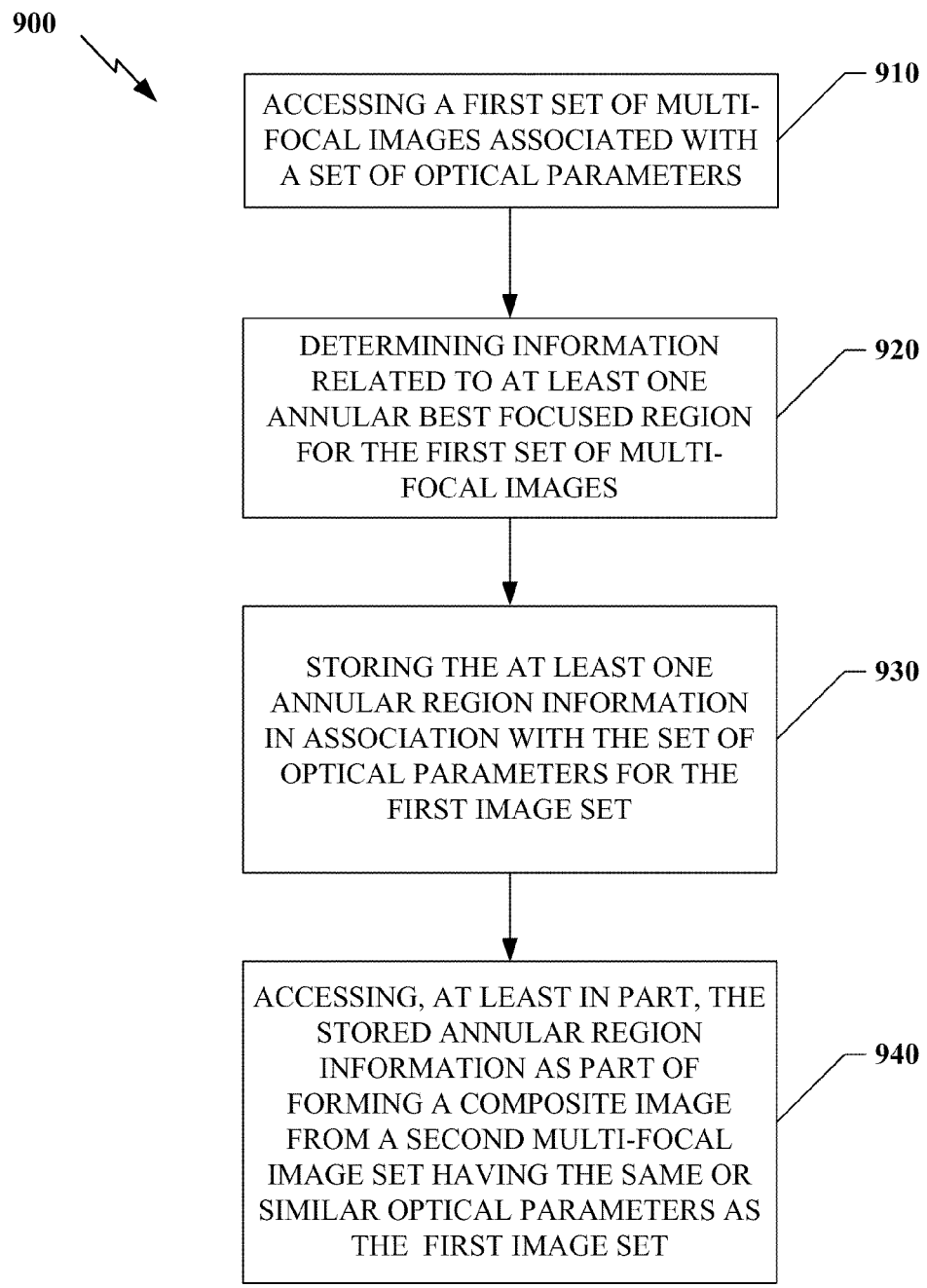
FIG. 9 illustrates a method for generating a well focused image from a set of multifocal images.

FIGS. 7-9 illustrate methodologies, flow diagrams, and/or timing diagrams in accordance with the disclosed subject matter. It is to be appreciated that the methodologies presented herein can incorporate actions pertaining to a neural network, an expert system, a fuzzy logic system, and/or a data fusion component, or a combination of these, which can generate information indicative of the optimization of operations germane to the disclosed methodologies, especially where pertaining to generating a well focused image from a set of multifocal images.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 facilitating determining a set of annuluses that model the shapes of best focused image regions within a multi-focal image set in accordance with the disclosed subject matter. At 710, methodology 700 can access a set of multifocal images. At 720, the accessed multi-focal image set can be analyzed to determine best focused points (BFPs). At 730, a sub-set of images can be selected as partially well focused (PFW) images based, at least in part, on the BFP analysis of 720. At 740, the best focused image regions in the PWF image set can be modeled as a set of neighboring and concentric annular regions. At 750, based at least in part on the BFP analysis from 720, the parameters of the annular region model from 740 can be optimized. In an aspect, at 750, the annular regions can be simultaneously optimized to best fit to the BFPs while remaining concentric and neighboring. At this point methodology 700 can end.

In an aspect, where a set of PWF images has already been determined for a multi-focal image set, it will be apparent to one of skill in the art, that methodology 700 can be entered directly at 740. One of skill in the art will similarly appreciate that error correction techniques, those described herein and others, can be employed to remove outlier BFPs at any portion of methodology 700 without departing for the disclosed subject matter. Further, one of skill in the art will appreciate that a balance can be struck between the cost of determining additional BFP points (and the corresponding resulting modeled annulus) and the overall quality of the focus in a final image incorporating a determined annular region. Such quality determinations can induce a quality analysis into method 700 without departing from the disclosed subject matter, for example, a different series or sub-set of preselected points can be analyzed, convergence analysis can be done to determine the extents of a well focused annular region, etc., without departing from the disclosed methodology. The examples given herein with regard to various systems can similarly be applicable in whole or in part in methodology 700.

FIG. 8 illustrates a methodology 800 facilitating generating a well focused image from a set of multifocal images. At 810, of methodology 800 a set of partially well focused (PWF) images for a set of multifocal images can be accessed. This can be similar to or the same as accessing the PWF set selected at 730 of methodology 700 (wherein the PWF set can be a subset of a multifocal set from 710 of methodology 700 or data access as described in relation to image data access component 110 of system 100 and other systems disclosed herein).

At 820, annular region parameters related to the accessed set of PWF images can be accessed. The annular region parameters can be determined in a manner that is the same as, or similar to, that as illustrated in regards to methodology 700. In an aspect, the annular region parameters can be contemporaneously determined and accessed. In another aspect, the annular region parameters can be previously determined and stored for access. By predetermining the annular region parameters and storing them for future access, significant computational time can be saved in compositing an image. This front loading of computations related to the annular region parameters reduces or eliminates the need to compute these values when fast image composition is desired during real-time imaging operation. In a related aspect, because the annular region parameters can be related to particular physical parameters of a catadioptric camera system, the predetermined and stored annular region parameters can be employed to calibrate and/or composite images in real-time operation for catadioptric camera systems with the same, or similar, physical parameters (e.g., where a production run of the same model of catadioptric cameras is produced, a pre-computed single annular region parameter set can applied to every camera because they have identical or similar physical optical set-ups; predetermined annular region parameters can be employed to verify the conformance of a production run of the same model of catadioptric cameras; etc.).

At 830 of methodology 800, portions of each image in the set of PWF images can be selected based, at least in part, on the annular region parameters accessed at 820. In an aspect, this can be viewed as a type of image cropping whereby, for example, an annular image region is cropped out of each image in the set of PWF images.

At 840, the selected portions of each image in the set of PWF images can be combined into a composite best focused image. At this point methodology 800 can end. Continuing with the above cropping example, the "cropped portions" of each of the PWF images represent concentric, neighboring, well focused image regions wherein the annular region parameters were optimized, for example, as at 750 of methodology 700. The resulting composite image therefore can be an overall best focused image. The identification of annular best focus image regions can be based on additional information in a manner similar to, or the same as, disclosed in regard to methodology 700. One of skill in the art will appreciate that error correction techniques, those described herein and others, can be employed to improve the generation of concentric annular best focused regions, as disclosed herein, without departing for the disclosed subject matter. Quality determinations can also be employed and is considered within the scope of the disclosed subject matter. The examples given herein with regard to various systems can similarly be applicable in whole or in part in methodology 800.

FIG. 9 illustrates a methodology 900 facilitating generating a well focused image from a set of multifocal images. At 910 of methodology 900, a first set of multifocal images can be accessed. This access can be the same as or similar to other described multifocal image access disclosed herein (e.g., 110, 410, 710, etc.) At 920, information relating to at least one best focused annular region for the first set of multifocal images is determined. In some particular situations, a single best focused annular region is associated with a well focused output image where the DOF is wide enough to encompass the whole caustic volume, as disclosed herein. Thus, it is feasible that for a particular optical setup the DOF may be sufficient to require only a single annulus (e.g., a disk from the optical axis to the extents of the imager) to present a well focused output image. However, this example is only included for completeness of disclosure and it is within the scope of the disclosure and methodology 900 that a plurality of best focused annular regions will be determined at 920. Further, it will be appreciated by one of ordinary skill in the art that these at least one annular regions will typically be neighboring concentric annular regions employed in forming a well focused output image as disclosed extensively herein.

At 930, the information relating to the at least one annular regions determined at 920 of methodology 900 can be stored. Further, the stored information can be associated with the set of optical parameters employed in acquiring the first multifocal image set. This stored information can be employed as a form of calibration data. Further, one of skill in the art will appreciate that a plurality of annular information indexed to a plurality of optical parameters can be stored allowing a lookup of such information. For example, the DOF can be, at least in part, dependant on the aperture of the imaging camera in a catadioptric system. A series of multifocal image sets can be acquired for different aperture settings. Each of these multifocal image sets can have a different set of concentric annular best focused areas associated with the change in DOF resulting from the different aperture settings. Each of these multifocal image sets can be analyzed and the resulting concentric annular image data stored and associated with the respective optical settings (e.g., the differing aperture settings). This stored information can function as a lookup table, calibration set, hash table, etc., in accord with the disclosed subject matter, as will be appreciated by one of skill in the related arts.

At 940 of methodology 900, at least a portion of the stored information can be accessed as part of forming a composite overall well focused image from a second multifocal image set. At this point methodology 900 can end. The stored best focused annular region information can be related to the optical parameters of the related image set. Having already solved the first multifocal image set for annular data across the image sets to facilitate generating a well focused output image, this same annular information can generally be applied to a second multifocal image set captured under the same or similar optical parameters. As stated herein, the annular regions can map the CVB of a catadioptric system. Unlike a conventional dioptric system, this map is substantially independent of scene content and substantially dependant on optical system parameters (e.g., quadric mirror shape, focal length of the imager, position of the imager in relation to the mirror, aperture, etc.) Thus, for example, a fixed optical setup for a catadioptric imaging system typically can reuse the annular imaging data captured at 920 and stored at 930 of methodology 900 for other future output image compositions where the optical system parameters remain substantially static.

It is important to note that significant time can elapse between act 930 and 940 of methodology 900. As such, the annular region information can be stored long term and applied at a later time to one or more multifocal image sets having the same or similar optical parameters as those related to the stored annular region information. In an aspect this can significantly increase the speed of processing multifocal image data sets collected in real-time operation of a catadioptric camera system. For example, the optical parameters can function as an index into a library of annular region information that can then be directly applied to generate output best focused images without the need to repeatedly recalculate annular region information.

In an aspect, the stored information at 930 can function as a calibration data set. In another aspect, where it is determined that an optical system parameter has changed (e.g., output images using stored annular data for a purported optical setup are not overall well focused images) the methodology can simply recalculate the best focused image region data and update the stored information with the new annular information for the purported optical setup. One of skill in the art will appreciate that preserving historical data for known optical setup parameters and an associated output can be leveraged for numerous diagnostic and self-healing techniques that would be particularly attractive to distributed catadioptric monitoring systems (e.g., border patrol, aerial reconnaissance, security cameras, time lapse photography, etc.) All such diagnostic and self-healing techniques are considered within the scope of the present disclosure. For example, where a catadioptric system is monitoring glacial recession over a long period of time, environmental factors can have an effect on the optical parameters despite assumptions that these parameters are static. The imaging system can employ methods like methodology 900 to adapt to the changing optical parameters by either recalibrating the optical parameters to produce an output image in accord with the recorded annular data for the purported optical parameters, or updating the stored annular data to new calibrations when it is determined that the system is out of calibration. In another example, a military reconnaissance drone can use lookup tables to rapidly process images from different optical system parameters by employing methods the same as or similar to methodology 900. Further, the drone camera catadioptric camera system can self-monitor and automatically correct for unexpected changes in the optical setup parameters, for example, changes in the optical path resulting from a rough deployment, extended use, etc. One of skill in the art will appreciate that the specific examples of the application of methodologies that are the same as or similar to methodology 900 are nearly limitless and will further appreciate that all such methodologies are considered within the scope of the present discloser.

Figure 10:
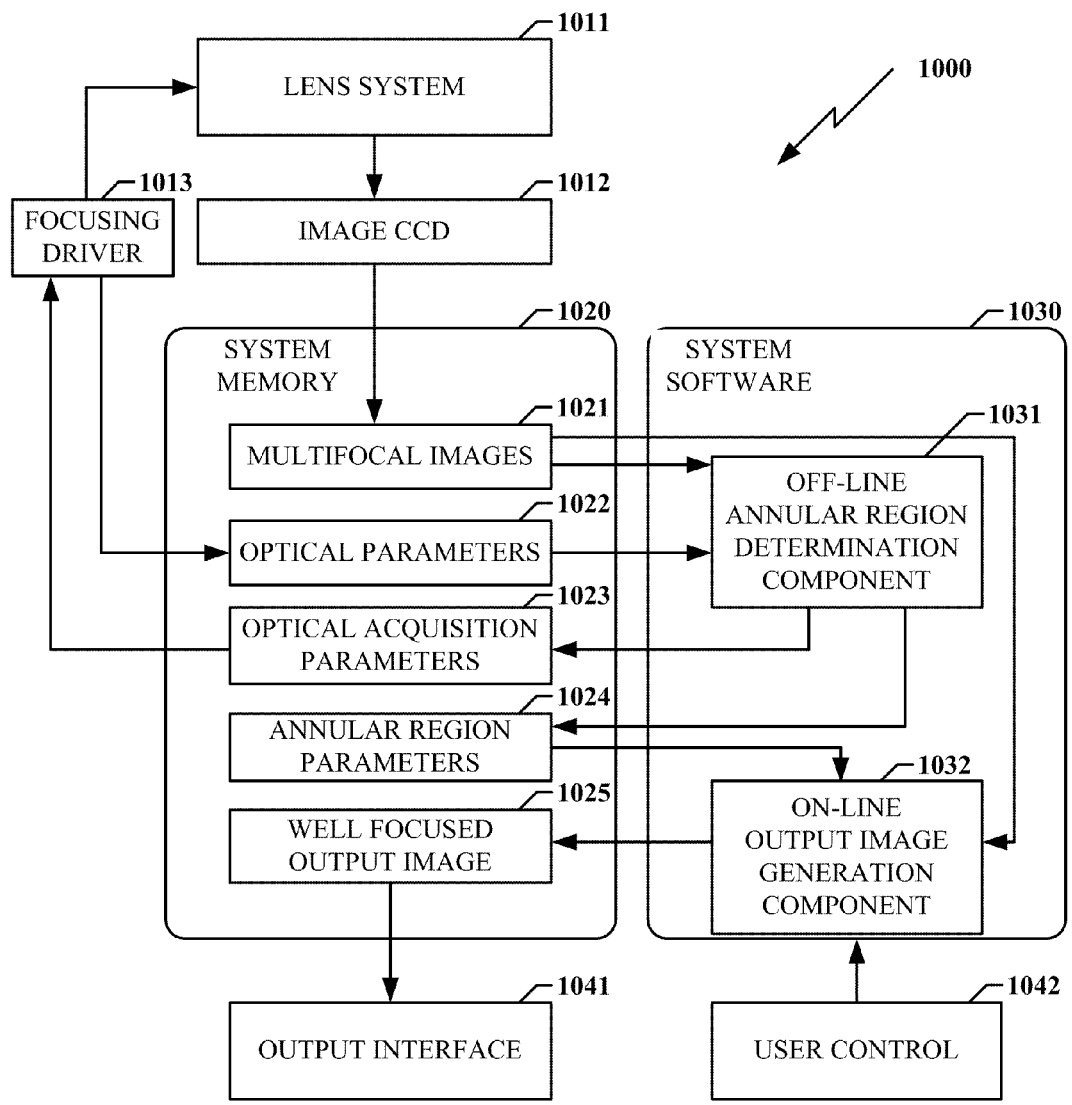
FIG. 10 is a diagram illustrating the various components of a non-limiting exemplary integrated catadioptric system facilitating the generation of an overall well focused image from a set of multifocal images in accordance with the present disclosure.

FIG. 10 is a diagram illustrating the various components of an exemplary integrated catadioptric system 1000 facilitating the generation of an overall well focused image from a set of multifocal images in accordance with the present disclosure. FIG. 10 is presented to be illustrative and as a non-limiting example of a catadioptric system in accord with the presently disclosed subject matter. It is not intended to define, narrow, or limit any portion of present disclosure. The exemplary system 1000 includes optical components, hardware and software and can be used as an individual catadioptric camera or part of an individual catadioptric camera. In a particular aspect, exemplary system 1000 can be used in catadioptric cameras where the DOF is not wide enough to capture the caustic volume, such as in compact catadioptric cameras and light-efficient catadioptric cameras working with large apertures.

The exemplary system 1000 includes focusing driver 1013 which can control the focal setting of the lens system 1011. Light rays emitting from real world objects are first reflected by a curved rotationally symmetric mirror (not illustrated) and then pass through lens system 1011 to be recorded on image CCD 1012. The focusing driver 1013 can manipulate the lens system 1011 to focus at different distances and thus images with different focal settings can be captured and stored as a set of multifocal images 1021 in system memory 1020. The focusing driver 1013 can also control the aperture size of the lens system. While capturing an image, the optical parameters, such as the focal setting and aperture size, can also be recorded with that image as an optical parameter 1022 in the system memory 1020.

The system software 1030 can include an off-line annular region determination component 1031 and an on-line output image generation component 1032. The term, "off-line", within FIG. 10 and the related discussions, is related to a temporal aspect associated with a period of time in which information can be generated for later use when the exemplary system is in deployed operation (e.g., predetermining information, generating calibration data, etc.). The term "on-line", within FIG. 10 and the related discussions, is related to a temporal aspect related to the operational use of the exemplary system in contrast to one or more data predetermination periods. These terms will be appreciated by one of basic skill in the art to be associated with accelerating the generation of overall well focused images by reducing computations while a camera system is "on-line" for a catadioptric camera in deployed operation by employing predetermined annular region parameters, generated during an "off-line" period, related to substantially static optical parameters. The off-line annular region determination component 1031 can execute a method similar to, or the same as, portions of methodology 900, for example, as at 910 through 930. The on-line output image generation component 1032 can execute a method similar to, or the same as, other portions of methodology 900, for example as at 940. The off-line annular region determination component 1031 can access multifocal images 1021 and their associated optical parameters 1022 from the system memory 1020. Off-line annular region determination component 1031 can determine the number and identity of each image comprising a set of partly well focused (PWF) images from the multifocal images 1021. The optical parameters 1022 related to the set of PWF images can be accessed by off-line annular region determination component 1031 and then can be stored as optical acquisition parameters 1023 in the system memory 1020. Optical acquisition parameters 1023 are then accessed by the focusing driver 1013 to facilitate directly capturing future sets of PWF images, which can reduce the image capturing time compared with taking the entire set of multifocal images. The captured PWF images can also be stored in component 1021 of the system memory. The off-line component 1031 can execute a method similar to or the same as at 910 through 930 of the methodology 900 to determine a set of best focused annular regions for the set of PWF images and store them as the annular region parameters 1024 in the system memory 1020.

Upon receiving an indication through user control 1042, a new set of PWF images can be captured. When a new set of PWF images are captured, they can be immediately accessed from multifocal images 1021 in the system memory by the on-line output image generation component 1032. The on-line component can also access the annular region parameters 1024 and then use the methods similar to or the same as those described in regard to methodologies 800 and/or 900 to generate an overall well focused composite image and store it as a well focused output image 1025 in the system memory 1020. The system 1000 can include an output interface component 1041 to make the output image 1025 available either by displaying it on an image monitor (not illustrated) or exporting it to exterior storage or processing devices (not illustrated). According to the needs of real applications, a user can use the user control component 1042 to cause the off-line component 1031 to update the stored optical acquisition parameters 1023 and annular region parameters 1024. This update can be useful when the installation configuration or optical settings of a catadioptric system have changed.

Figure 11:
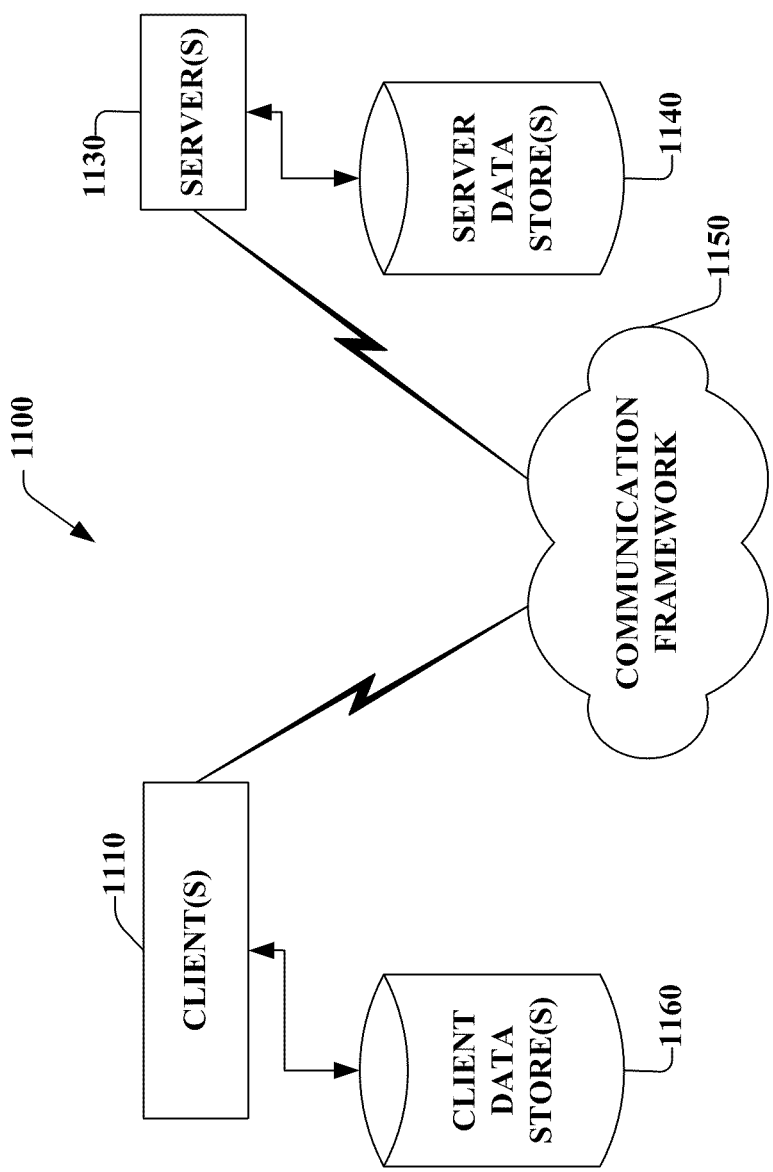
FIG. 11 is a high level illustration of a distributed system to facilitate generating a well focused image from a set of multifocal images.

FIG. 11 is a high level illustration of a distributed system facilitating the generation of a focused image from a set of multifocal images in accordance with the present disclosure. The system 1100 includes one or more client(s) 1110. The client(s) 1110 can be hardware and/or software (e.g., threads, processes, computing devices). The system 1100 also includes one or more server(s) 1130. The server(s) 1130 can be hardware and/or software (e.g., threads, processes, computing devices). The servers 1130 can house threads or processes to perform transformations by employing the disclosed subject matter, for example.

One possible means of communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

Figure 12:
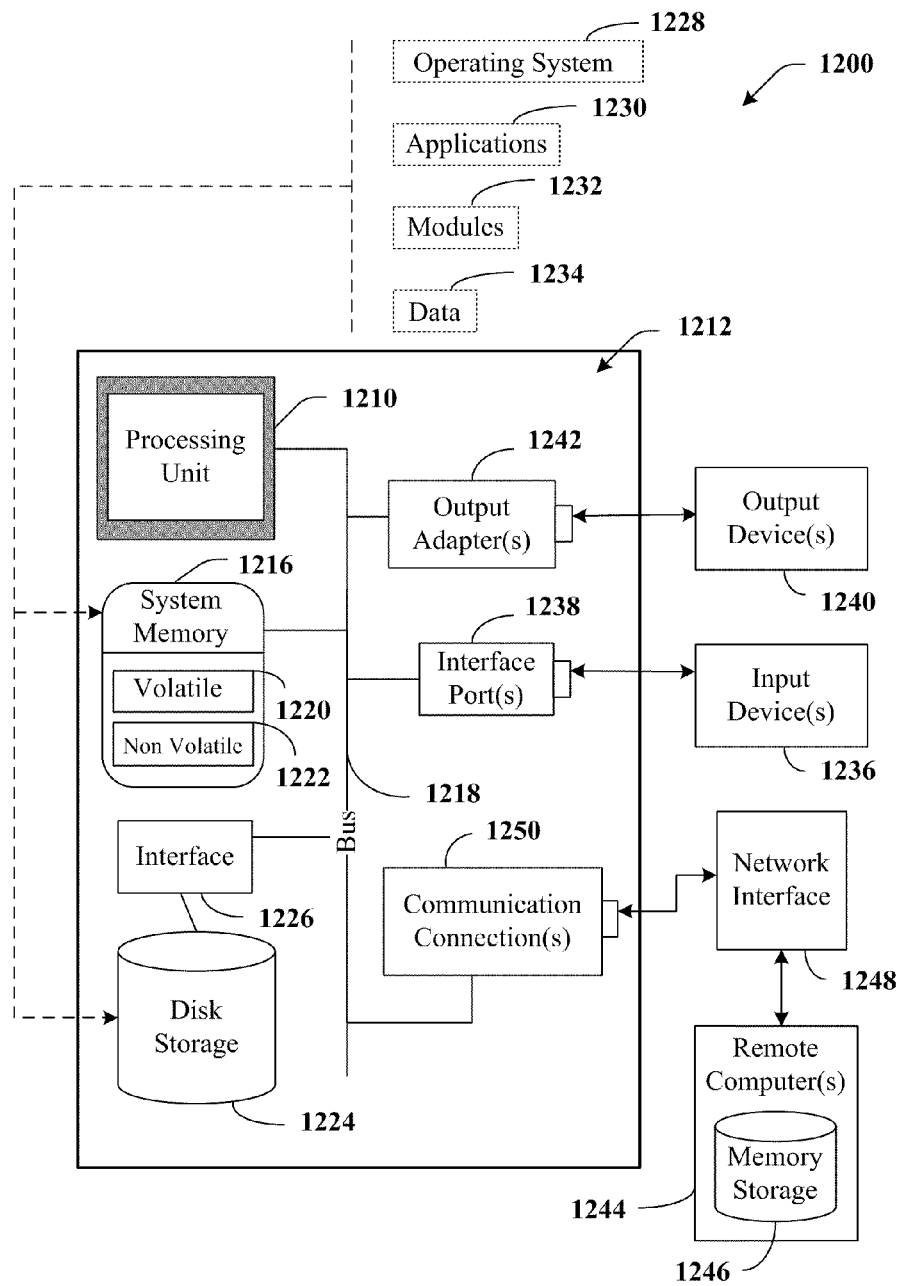
FIG. 12 is an illustration of an exemplary computing environment facilitating generation of a well focused image from a set of multifocal images in accordance with the presently disclosed subject matter.

With reference to FIG. 12, illustrated is an exemplary environment 1200 for implementing various aspects of the disclosed subject matter and includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
   a memory to store instructions; and
   a processor, coupled to the memory, that facilitates execution of the instructions to perform operations, comprising:

accessing multifocal input image data of a set of multifocal input images from an image capturing device comprising a rotationally symmetric mirror;

determining a focused annular image region related to the multifocal input image data; and generating output image data comprising image data corresponding to the focused annular image region.

2. The system of claim 1, wherein the multifocal input image data includes simultaneous multifocal image data or contemporaneous focus-bracketed image data, and focus-bracketed image data comprises image data for a series of images employing different focus settings.

3. The system of claim 1, wherein the set of multifocal input images comprises:
   a first image corresponding to image data that is determined to satisfy a first defined condition related to an image depth of field encompassing an area more proximal to a mirror than a caustic volume boundary related to the rotationally symmetric mirror when the image was captured for a set of focused points comprising the first image;
   a second image corresponding to image data that is determined to satisfy a second defined condition related to an image depth of field encompassing an area more distal to the rotationally symmetric mirror than the caustic volume boundary within the imaging area when the image was captured for a set of focused points comprising the second image; and
   a third image corresponding to image data that is determined to satisfy a third defined condition related to an image depth of field intersecting the caustic volume boundary within an image capture area of the image capturing device for a set of focused points comprising the third image.

4. The system of claim 3, wherein the first, second, or third defined condition is based on a count value equivalent, or substantially equivalent, to a defined number of focused points that satisfy a focus condition for the set of focused points comprising the image corresponding to the first, second or third condition, and wherein the image corresponding to the first, second or third condition is determined to comprise more focused points than other images comprising the set of multifocal input images.

5. The system of claim 1, further comprising determining a target focused point based on a determination that an image from the set of multifocal input images comprises more focused points than other images of the set of multifocal input images and the target focused point is present in a plurality of images of the set of multifocal input images.

6. The system of claim 5, further comprising determining a set of annular image regions within images comprising the set of multifocal input images, the set of annular image regions comprising the focused annular image region, based on determining the target focused point.

7. The system of claim 1, wherein the image capturing device comprises an optical axis coincident with, or substantially coincident with, a symmetrical axis of the rotationally symmetric mirror.

8. The system of claim 7, wherein the image capturing device generates image data including simultaneous multifocal image data or contemporaneous focus-bracketed image data, and focus-bracketed image data comprises image data for a series of same-scene images employing different focus settings.

9. The system of claim 1, wherein the rotationally symmetric mirror is a quadric rotationally symmetric mirror.

10. The system of claim 9, wherein the image capturing device is spatially located at a distance from the quadric rotationally symmetric mirror, wherein a depth of field of the image capturing device is less than a depth of a caustic volume within an imaging area of the image capturing device.

11. The system of claim 9, wherein the image capturing device employs an aperture sized to satisfy a condition that the depth of field of the image capturing device is less than the depth of the caustic volume within the imaging area of the image capturing device.

12. A method, comprising:
accessing, by a system comprising a processor, data relating to a set of multifocal input images captured by an image capturing device comprising a rotationally symmetric mirror;
determining, by the system, a set of well-focused points within a plurality of images comprising the set of multifocal input images, wherein a well-focused point of the set of well-focused points satisfies a defined focus condition; and
determining, by the system, a sub-set of partly well-focused images from the set of multifocal input images based on determining that an image comprising the sub-set of partly well-focused images contains a well-focused image region that comprises one or more of the well-focused points of the set of well-focused points.

13. The method of claim 12, further comprising modeling the well-focused image region of the images comprising the sub-set of partly well-focused images as a series of annular regions.

14. The method of claim 13, wherein the series of annular regions are adapted to fit the set of well-focused points.

15. The method of claim 13, further comprising combining the well-focused image regions corresponding to the series of annular regions into a composite output image.

16. The method of claim 13, wherein the well-focused image regions combined into the composite output image are neighboring, concentric, annular image regions.

17. A method comprising:
accessing, by a system comprising a processor, data related to a first multifocal input image set associated with a first set of optical parameters, wherein the first multifocal input image set is captured by an image capturing device comprising a rotationally symmetric mirror;
determining, by the system, a region parameter for a set of neighboring, concentric, annular regions of a sub-set of the first multifocal input image set, wherein the neighboring, concentric, annular regions are associated with well-focused image regions within the sub-set of the first multifocal input image set, and a well-focused image region of the well-focused image regions comprises a set of well-focused points determined to satisfy a defined focus condition; and
storing, by the system, the first set of optical parameters and the region parameters for future access.

18. The method of claim 17, wherein the region parameter is correlated to the first set of known optical parameters.

19. The method of claim 18, further comprising:
accessing data related to a second multifocal input image set associated with a second set of optical parameters that are the same as, or substantially the same as, the first set of optical parameters, wherein the second multifocal input image set is captured by the image capturing device comprising the rotationally symmetric mirror;
accessing the region parameter; and
generating an output image related to the second multifocal input image set based on the region parameter.

20. An apparatus comprising:
means for accessing data relating to a set of multifocal input images captured by an image capturing device comprising a rotationally symmetric mirror;
means for determining region parameters associated with a set of target focused points of a sub-set of images of the set of multifocal input images, wherein the set of target focused points comprises a point determined to satisfy a defined focus condition; and
means for storing the region parameters correlated with an index value relating to a property of the set of multifocal images to facilitate generating an output image from a set of multifocal input images.

21. The apparatus of claim 20, wherein the index value relates to a physical optical parameter of a catadioptric camera system comprising the image capturing device.

22. An apparatus comprising:
means for accessing a stored region parameter by employing an index value relating to a property of a set of multifocal images captured by an image capturing device comprising a rotationally symmetric mirror; and
means for applying the region parameter to the set of multifocal images to facilitate generating an output image.

23. The apparatus of claim 22, wherein the index value relates to a physical optical parameter of a catadioptric camera system comprising the image capturing device.

24. A catadioptric image capture device comprising:
a memory to store instructions; and
a processor, coupled to the memory, that facilitates execution of the instructions to at least:
generate computer accessible data related to focus-bracketed images of at least a portion of a virtual object space of a rotationally symmetric mirror of an optical device for capturing an image, wherein the focus-bracketed images comprise a series of same-scene images employing different focus settings; and
generate an output image comprising concentric annular shaped portions of one or more focus-bracketed image of the focus-bracketed images, said concentric annular shaped portions being selected for containing a focused portion of an image.

25. The catadioptric image capture device of claim 24, wherein an optical axis is coincident with, or substantially coincident with, a symmetric axis of the rotationally symmetric mirror.

* * * * *